INVENTOR
MASAHISA MIYAGI
BY
Hopgood & Calimafde
ATTORNEYS

INVENTOR
MASAHISA MIYAGI
BY
Hopgood & Calimafde
ATTORNEYS

INVENTOR
MASAHISA MIYAGI
BY
Hopgood & Calimafde
ATTORNEYS

INVENTOR
MASAHISA MIYAGA
BY
Hopgood & Calimafde
ATTORNEYS

United States Patent Office 3,444,320

Patented May 13, 1969

3,444,320

TIME DIVISION FREQUENCY SHIFT TRANSMISSION SYSTEM

Masahisa Miyagi, Tokyo, Japan, assignor to Nippon Electric Company Limited, Tokyo, Japan, a corporation of Japan Filed Mar. 19, 1965, Ser. No. 441,224

Claims priority, application Japan, Mar. 21, 1964, 39/151,541

Int. Cl. H04l 5/00

U.S. Cl. 178—50 1 Claim

ABSTRACT OF THE DISCLOSURE

A synchronization detection system for a time-division frequency-shift keying code transmission system in which codes are transmitted by keying the frequency of a carrier wave to two or more frequencies in time-division fashion.

Figure 1:
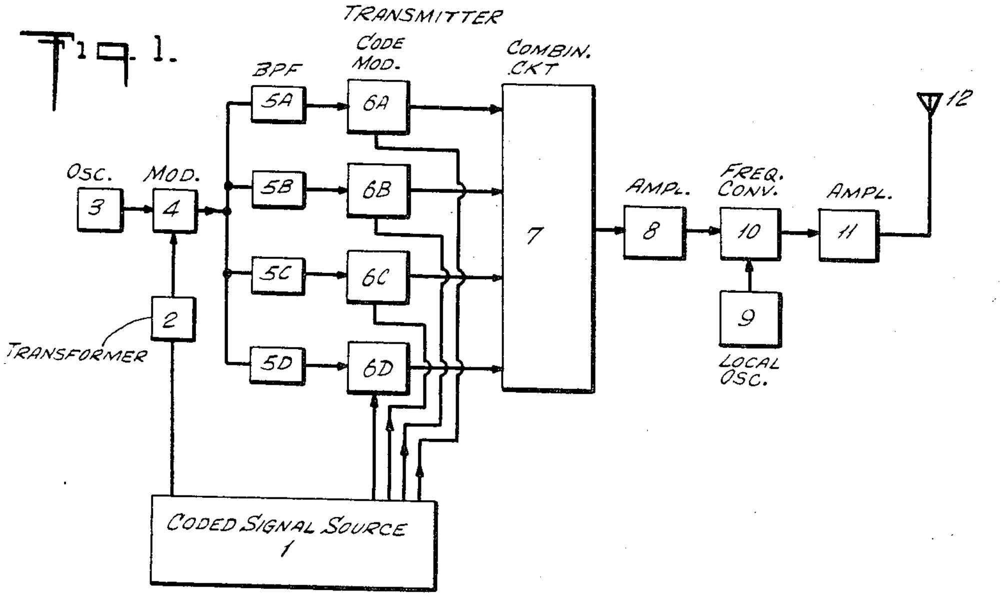

The transmitter includes means for amplitude or phase modulating a first carrier by a transmitter pulse train and also means for selecting a plurality of carrier waves from said first carrier. The transmitter also includes means for keying the selected carrier waves in time-division fashion to code-modulate each selected carrier wave in synchronism with the frequency-shift keying.

The receiver includes modulating means utilizing a receiver pulse train in synchronism with the tarnsmitter pulse train, to amplitude or phase modulate a second carrier produced independently of said first carrier. The receiver further includes means to select a plurality of carrier waves corresponding to those selected in the transmitter, from the second carrier. Means are also provided for frequency-converting the received frequency-shift keyed wave to time-division code-modulated waves of the same frequency by interdetection of this received wave and the latter-mentioned carrier waves. The output from the frequency converting means is then fed to combining means to derive a code-modulated wave of the same frequency. Also included is means to produce a reference carrier for synchronization detection from the latter code-modulated wave and means to produce synchronization detection between the reference carrier and the code-modulated waves at the output of the frequency converting means.

This invention relates to a synchronization detection system for a time-division frequency-shift-keying code transmission system, such as a frequency-shift-keying or a frequency-shift-keying phase-modulation system employing a plurality of carrier frequencies, wherein codes are transmitted in a time-division frequency-shift-keying manner.

It has been difficult to derive a reference carrier wave for use in synchronization detection of a carrier wave that is keyed in time-division fashion among a plurality of frequencies, because the carrier wave is, in effect, a plurality of carrier waves each of which is used discontinuously. Furthermore, recent transmission theory studies have shown that synchronization detection enables transmission to be performed at high efficiency. Also, it will be appreciated that it becomes more economical to raise the efficiency of transmitting a given amount of information.

Accordingly, it is an object of this invention to provide a practical synchronization detection arrangement for a time-division frequency-shift-keying code transmission system.

It is another object of the invention to provide a practical synchronization detection means for a frequency-shift-keying carrier wave system wherein the carrier wave is used discontinuously.

A further object of the invention is to improve the economy of operation of a system of the type referred to by increasing the efficiency of transmission thereof.

Figure 2:
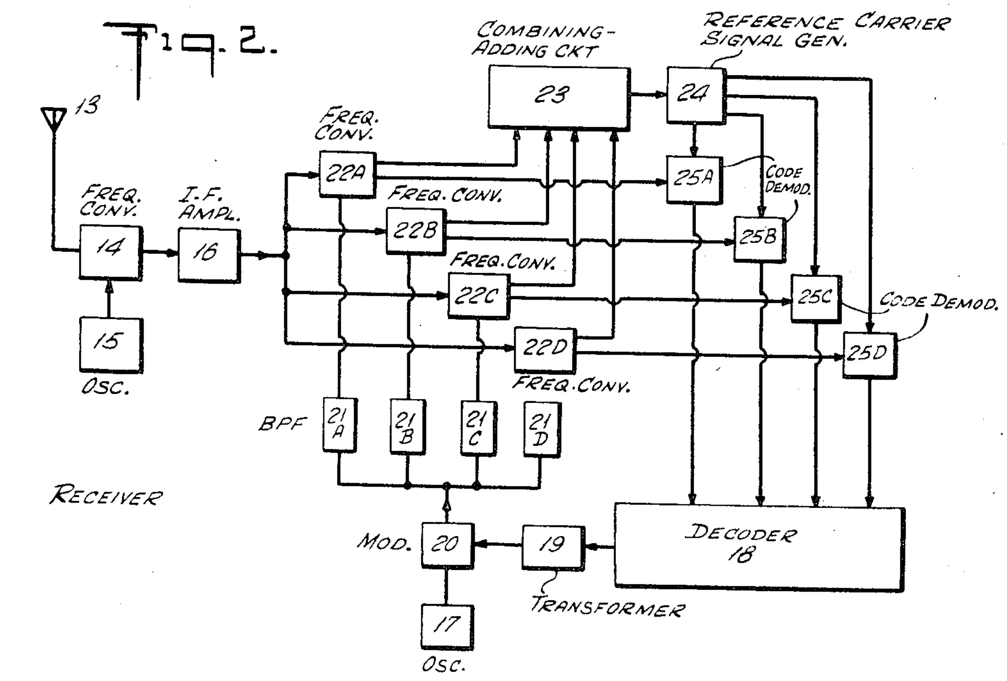

All of the objects, features and advantages of this invention and the manner of attaining them will become more apparent and the invention itself will be best understood by reference to the following description of an embodiment of the invention taken in conjunction with the accompanying drawing, in which:

FIG. 1 illustrates the principle of a transmitter of a time-division frequency-shift-keying code transmission system according to a first embodiment of the invention, FIG. 2 illustrates the principle of a receiver of the time-division frequency-shift-keying code transmission system according to the first embodiment of the invention.

Figure 3:
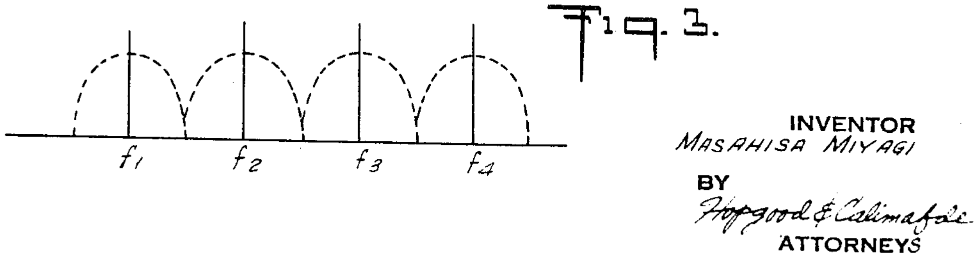
Figure 4:
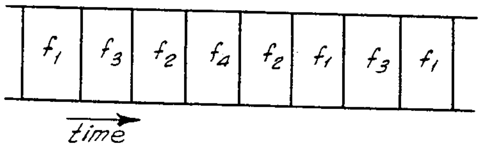
Figure 5:
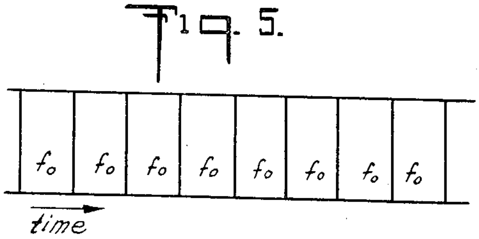
Figure 6:
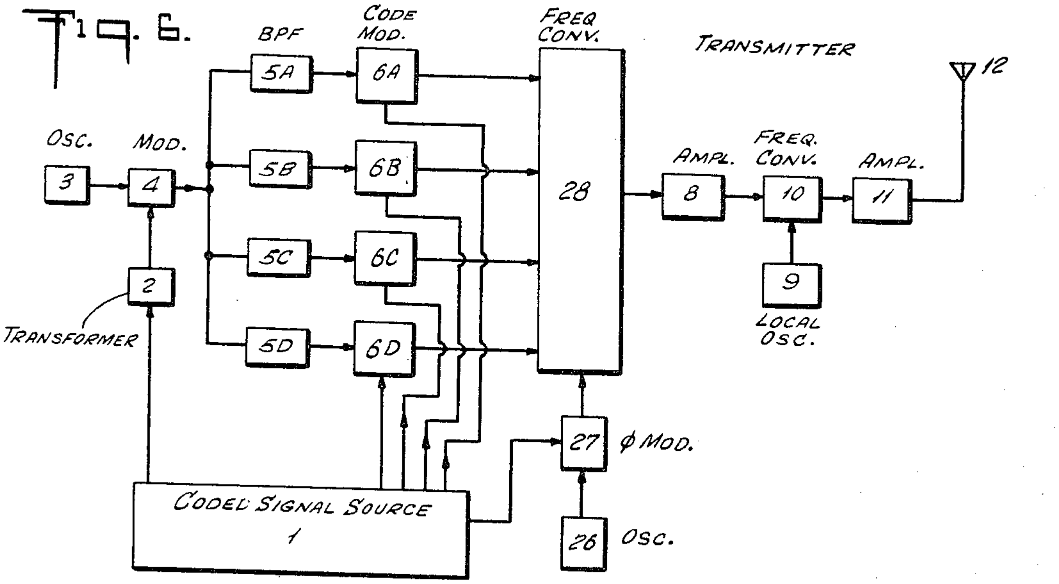
Figure 7:
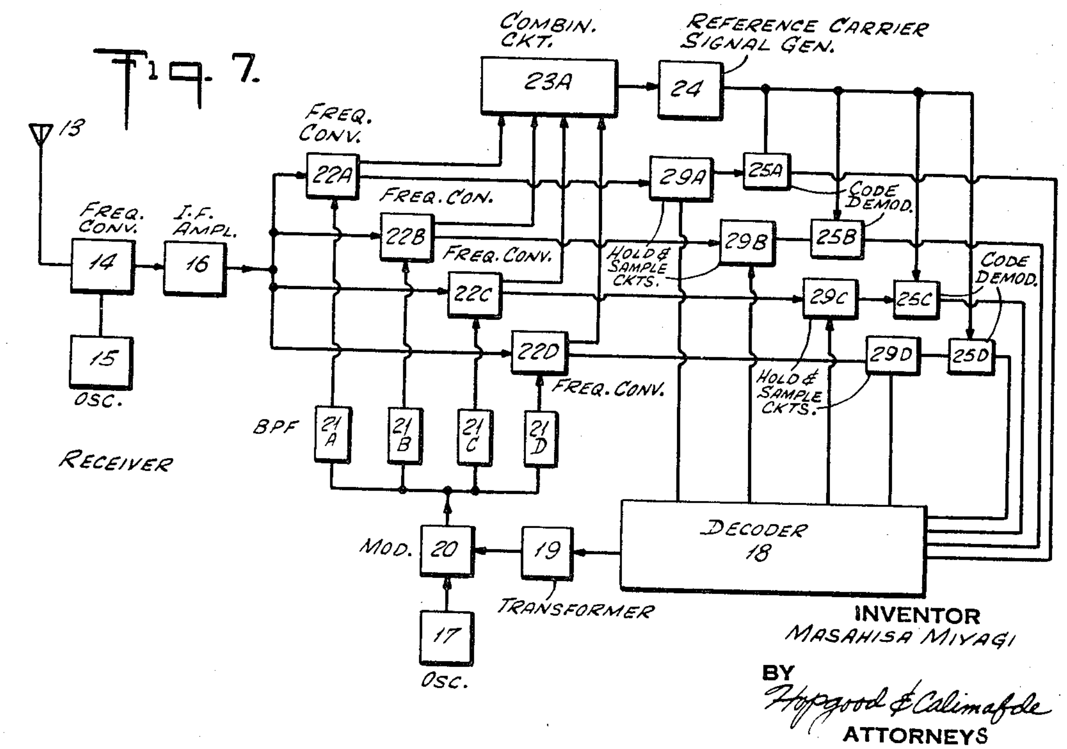
Figure 8:
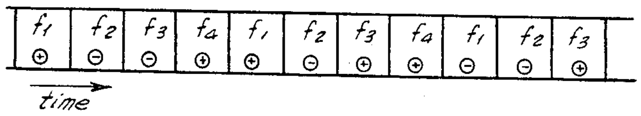
Figure 9:
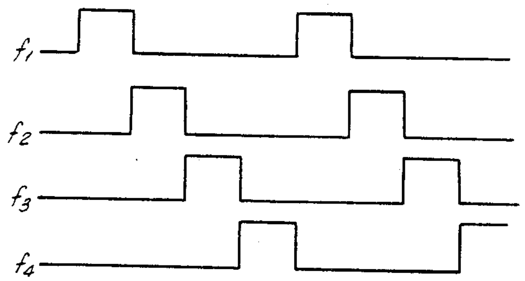
Figure 10:
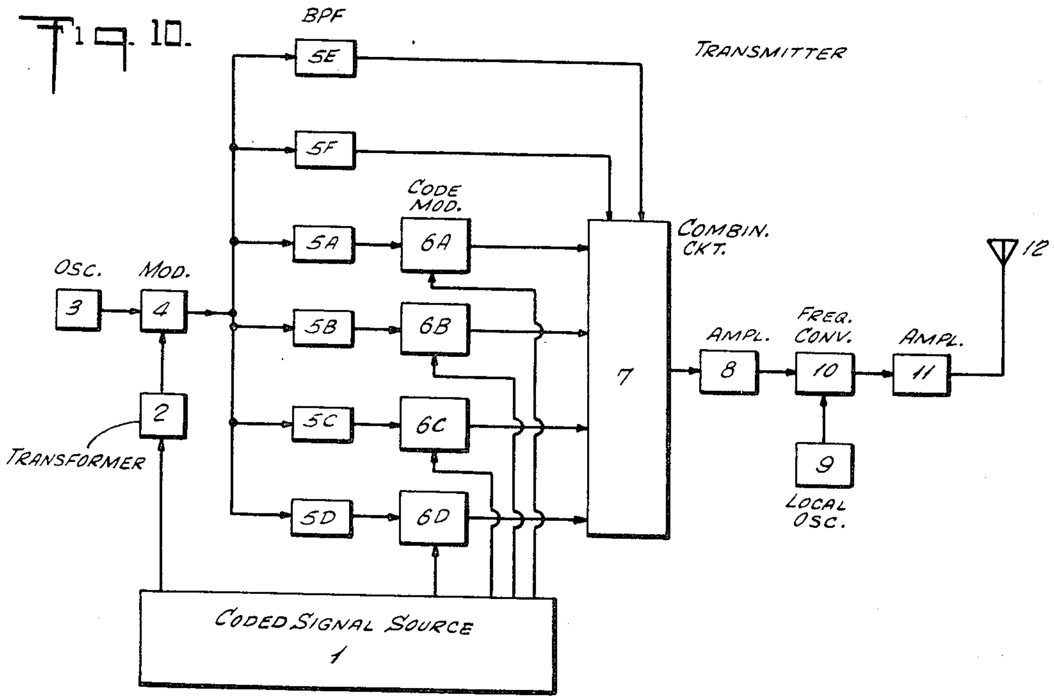
Figure 11:
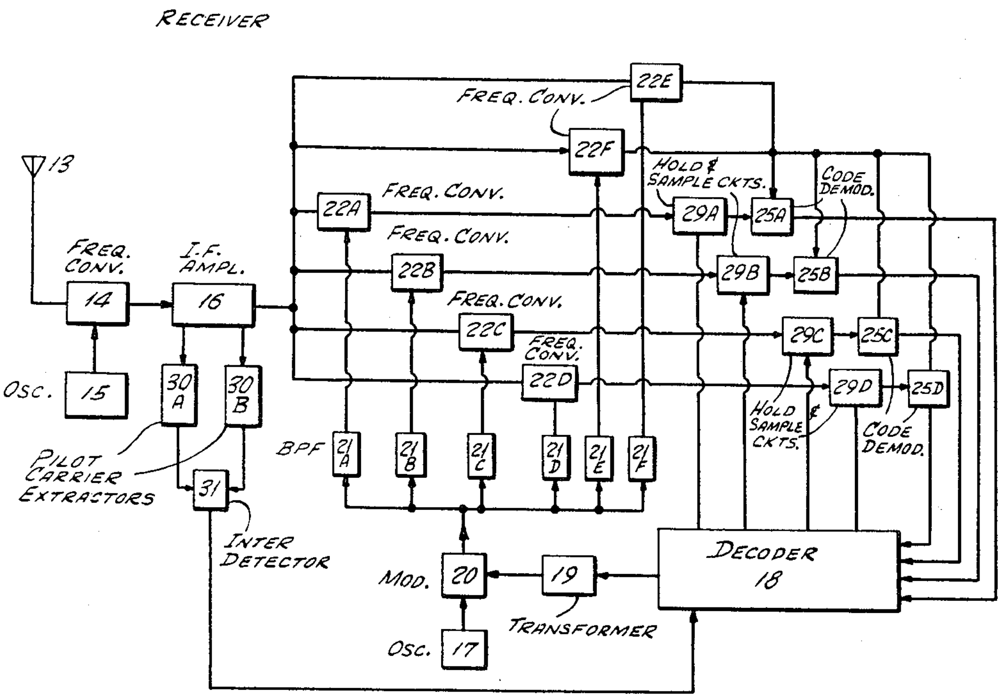

FIG. 3 illustrates the principle of the frequency arrangement according to the first embodiment of the invention, FIG. 4 illustrates the time arrangement of an example of the signal wave transmitted in the first embodiment of the invention, FIG. 5 shows, in principle, the time arrangement of a wave of a single frequency which is obtained through frequency conversion from the signal wave in the receiver of the first embodiment of the invention, FIG. 6 illustrates a transmitter according to a second embodiment of the invention, FIG. 7 shows a receiver according to the second embodiment of the invention, FIG. 8 illustrates one example of the time arrangement of the transmitted signal wave for the second embodiment of the invention, FIG. 9 shows another example of the time arrangement of the transmitted signal wave for the second embodiment of the invention, FIG. 10 illustrates a transmitter according to a third embodiment of the invention, and FIG. 11 shows a receiver arrangement in accordance with the third embodiment of the invention.

In accordance with this invention, a radio code transmission system is provided wherein a reference carrier wave is derived for synchronization detection, so that both transmission and reception may be performed at high efficiency. More particularly, this invention provides a synchronization detection system for a time-division frequency-shift-keying code transmission system wherein codes are transmitted by keying the frequency of a carrier wave to two or more frequencies in time-division fashion, the system comprising a transmitter and a receiver. The transmitter includes means for amplitude or phase-modulating a first carrier wave by a transmitter pulse train. The pulses of this train may be pulses from a clock pulse source, or may be derived by frequency multiplication or division of the transmitter clock pulses, or from the transmitter clock pulses through preselected wave-form transformation in such a manner that the same may contain the information of the clock pulses. The transmitter further includes means for selecting a plurality of carrier waves from the first carrier wave, the side-band components, and the higher harmonics produced by the modulation, and also includes means for sending out the codes, by keying the selected carrier waves in time-division fashion so as to carry out code modulation or by code modulating the amplitude and/or the phase of each selected carrier wave in synchronism with the frequency-shift keying. The receiver includes means for modulating in the same manner as in the transmitter, the amplitude or the phase of a second carrier wave produced independently of the first carrier wave by a receiver pulse train, which may be clock pulses, pulses obtained by frequency multiplication or division of the receiver clock pulses, or a signal wave derived from the receiver clock pulses through wave-form transformation of the type employed in the transmitter. As a result, the modulated second carrier contains the information of the receiver clock pulses, these pulses being in synchronism with the transmitter clock pulses. The receiver further includes means for continuously selecting a plurality of carrier waves, corresponding to the carrier waves selected in the transmitter, from the second carrier wave, the sideband components, and the higher harmonics produced by the receiver modulating means. Also included in the receiver is means for frequency-converting the received frequency-shift-keyed wave to time-division code-modulated waves of the same frequency by interdetection of this received wave and the last-mentioned carrier waves. The receiver still further includes means for combining portions of the code-modulated waves produced on the output side of the frequency-converting means therein, and which are passed through respective buffer circuits, to derive a code-modulated wave which is substantially continuous in time and is of the same frequency. Finally, the receiver also includes means for producing a reference carrier wave for synchronization detection from the code-modulated continuous wave, and means for performing synchronization detection between the reference carrier wave and the other portions of the code-modulated waves of the same frequency derived at the output of the frequency-converting means.

The transmission system described in this invention contemplates the transmission of frequency shifted time multiplexed signals. Thus, in reference to FIG. 1, a source of pulse coded signals 1 containing information to be transmitted provides both signals for switching AND circuits such as 6A through 6D, but also provides pulse control signals for activating a pulse waveform converter device 2. This latter device constitutes a wave shaper for producing narrow pulses used to amplitude-modulate a sinusoidal oscillator signal from source 3 at a frequency, say $f_0$, in the modulator 4. The pulses from the device 2 have a repetition frequency, say $f_c$, which results in producing a plurality of side-band signals at the output of the modulator 4 that are separated from one another by whole integer multiples of the repetition frequency $f_c$, e.g., the signal frequencies $f_0$, $f_0-f_c$, $f_0+f_c$, $f_0-2f_c$ $f_0+2f_c$, etc.

Thereupon the bandpass filters 5A through 5D select predetermined ones of those side-band signals. For example, assume filters 5A through 5D respectively select signal frequencies $f_0$, $f_0-f_c$, $f_0+f_c$ and $f_0+2f_c$. The AND gates 6A through 6D, as determined by the pulse signal source 1, pass the selected side-band signals on to the combiner circuit 7. Such combined circuit may be simply composed of a plurality of resistors having a common junction with said junction coupled to the amplifier 8.

It should be realized that the AND gates 6A through 6D are alternatively and sequentially enabled so that the output of circuit 7 comprises a frequency shifted time multiplexed signal which is basically repetitively cycled. For instance, the AND gate 6A is enabled each time after the other AND gates have been enabled. The output of the amplifier 8 is passed through a frequency converter which is fed by a local oscillator 9 for producing a transmission frequency that can be received by a receiver.

At the receiver, as illustrated in FIG. 2, the signals are passed through a frequency converter as is used in superheterodyne receivers whereby at the output of the intermediate frequency amplifier 16, the frequency shifted time multiplexed signals are reproduced, i.e., $f_0$, $f_0-f_c$, $f_0+f_c$ and $f_0+2f_c$.

In the explanation of FIG. 2, it should be realized that these frequency shifted time multiplexed reproduced signals are applied both to frequency converter networks

22A through 22D as well as the demodulator networks 25A through 25D. However, in order to enable the demodulators to operate as coherent demodulators, a signal frequency is needed which is representative of the frequency content in the information signals as generated in the transmitter. This is obtained by taking the output from the IF amplifier 16 and passing it through frequency-selective networks similar to the type used in the filters 5A through 5D. Such filter circuits are included in the networks 22A through 22D and provide selected side-band signals $f_0$, $f_0-f_c$, $f_0+f_c$ and $f_0+2f_c$, which thereupon are envelope-detected to generate a train of pulses from the decoder 18. This train of pulses from decoder 18 has a repetition frequency determined by the repetition frequency of each one of the side-band signals selected by the networks 22A through 22D, i.e., $f_c$.

This pulse train is then applied to a waveform "transformer" 19, like wave shaper 2, which merely produces the sharp pulses necessary to modulate the oscillator 17 in modulator 20 to regenerate side-band signals separated from one another by whole integer multiples of the repetition frequency $f_c$ from a center frequency $f_0'$ which is the frequency of oscillator 17. Thus the output of modulator 20 includes signals like $f_0'$, $f_0'-f_c$, $f_0'+f_c$, $f_0'+2f_c$, etc.

The networks 21A through 21D select corresponding multiples of those selected by the bandpass filters 5A through 5D, i.e., $f_0'$, $f_0'-f_c$, $f_0'+f_c$ and $f_0'+2f_c$. Corresponding pairs of side-band signals are then matched and are combined to produce a set of signals of the same frequency which can then be combined in a combining circuit 23. This is accomplished as follows. If the oscillator 17 has a frequency $f_0'$ which is higher than the oscillator 3 frequency $f_0$ and if the output of the network 21A is the side-band signal corresponding to $f_0'-f_c$ and this signal is thereupon combined in a frequency converter 22A to beat with the side-band signal corresponding to $f_0-f_c$, the output will be a signal representative of the difference in frequency between the two namely $f_0'-f_0$. By similarly combining and obtaining beat signals for the other side-band signals, a pulsed single frequency, $f_0'-f_0$, may be obtained, which after combining in a network 23, produces at the output of this network 23 a signal which is continuous in time. The continuous output from network 23 corresponds in time duration to the sum total of the pulse durations of each one of the side-band signals reproduced at the output of the IF amplifier 16.

Since the coded signal source 1 in FIG. 1 controls the duration of the enabling of the AND gates 6A through 6D and since one gate is enabled after the disabling of the previous gate, it is possible to obtain at the output of the combining circuit 23 a signal having a frequency which is continuous in time. The network 23 thereupon amplifies this combined signal and applies it to the demodulator networks 25A through 25D to provide coherent detection of the selected reproduced side-band signals.

The output of combining circuit 23 is coupled to the coherent detector, or synchronous detectors 25 by an amplifier 24. This is a conventional amplifier with sufficient bandwidth to permit the amplification of all of the side-band signals combined in circuit 23.

The coherent detector, also known as a synchronous detector, may be as described in the article by J. P. Costas entitled Synchronous Communications, Proceedings of the IRE, December 1956, pages 1713 to 1718, and the article by John K. Webb entitled, A Detailed Description of the Synchronous Detection Process, which appeared in the IRE Wescon Convention Record, vol. 1, part 8, pages 29 to 34, 1957.

Referring now to FIG. 3, $f_1$, $f_2$, $f_3$, and $f_4$ indicate the plurality of carrier waves produced by means explained with reference to FIG. 1, and contain in their mutual frequency spacings and phases the information relating to the repetition frequency of the transmitter clock pulses. More particularly, their frequency and phase relationships are determined by the repetition frequency of these clock pulses or the pulses derived by frequency multiplication or division thereof.

In FIG. 4, wherein the abscissa represents time, there is shown the manner in which the transmitted signal wave undergoes time-division frequency-shift-keying code modulation at a predetermined time interval. In the example illustrated in FIG. 4, four waves $f_1$, $f_2$, $f_3$, and $f_4$ are used to form a code-modulated wave, frequency-shift-keyed by the coded signal to be transmitted.

In FIG. 5, the successively arranged frequencies of FIG. 4 are shown after they have all been transformed by the frequency converters 22A–D to a single frequency $f_0$.

The invention has thus far been described of a synchronization-detection system for a code-transmission system wherein FSK is performed among four frequencies. A second embodiment will now be described of the synchronization-detection system for a time-division code-transmission system wherein phase-shift-keying (PSK) is carried out among a plurality of frequencies.

Referring to FIG. 6, wherein similar parts are designated with like reference numerals as in FIG. 1, the transmitter of the second embodiment of the invention includes means for modulating a carrier wave from the oscillator 3 by the transmitter clock pulses or a signal wave obtained by a preselected wave-form transformation of the clock pulses. The transmitter includes the band-pass filters 5A, 5B, 5C and 5D for extracting the plurality of carrier waves, for example four in number, from the first-mentioned carrier wave, the side-band components, and the higher harmonics produced as a result of the modulation. In order to carry out keying of these extracted carrier waves in time-division fashion, the transmitter also includes means in the coded signal source 1 for producing from the clock pulses, four phase gating pulses, which are supplied to code modulators 6A, 6B, 6C, and 6D. These latter pulses successively gate the carrier waves in the modulators 6A, 6B, 6C and 6D so that one only of the four carrier waves is supplied at a given time to a frequency converter 28. The gating pulses do not contain any information relating to the coded signals but are in synchronism with such signals and are used for carrying out the keying operation. The output of another oscillator 26 is supplied to a phase modulator 27 to be modulated, for example, in a two-phase PSK modulation manner and is then supplied to the frequency converter 28. The time-division frequency-shift-keying phase-modulated wave obtained at the output of the frequency converter 28 is then power-amplified and fed to the radiating antenna as in the case of the transmitter of FIG. 1.

Referring to FIG. 7 wherein similar parts are designated with like reference numerals as in FIG. 2, the receiver of the second embodiment of the invention comprises means for producing the local-oscillation carrier waves, in a similar manner as in the transmitter, by the receiver clock pulses in the outputs of the decoder 18, which are in synchronism with the transmitter clock pulses. Portions of the respective outputs of the frequency converters 22A, 22B, 22C, and 22D are all supplied to a combining circuit 23A so that the coded signals transmitted by the time-division frequency-shift-keyed wave may be converted to a continuous wave of a single frequency. Holding and sampling circuits 29A, 29B, 29C, and 29D hold, in this case, for four signal periods, the waves of a single frequency which have been converted from the time-division PSK-modulated wave, and sample the held signals, respectively. The decoder 18 supplies the set and reset pulses for the holding function and also the sampling pulses, to the holding and sampling circuits 29A, 29B, 29C, and 29DD,D to set and reset the holding function thereof, and to effect sampling of the received signal waves held therein at the end of every four signal periods. Code demodulators 25A, 25B, 25C, and 25D perform synchronization detection between the reference carrier wave for synchronization detection and the respective sampled outputs of the circuits 29A–D, thus demodulating the latter. The reference carrier wave generator 24 serves to produce from the output of the combining circuit 23A, the reference carrier wave for demodulation.

Referring to FIG. 8, the transmitted signal wave of the second embodiment of FIGS. 6 and 7 is composed of successive fragmental wave portions $f_1$, $f_2$, $f_3$ and $f_4$ which are arranged in time-division fashion as exemplified therein, and are subjected to PSK modulation so that the phase of an individual carrier wave portion may either be positive or negative according to the coded signal. For example, $f_1\oplus$ represents a carrier wave portion of the frequency $f_1$ and of positive phase, and $f_3\ominus$ represents another carrier wave portion of the frequency $f_3$ and of negative phase.

Referring to FIG. 9, the carrier waves $f_1$, $f_2$, $f_3$, and $f_4$ are represented as keyed cyclically in the time-division manner. Thus it is seen that the carrier wave $f_1$ is transmitted during only one-fourth the time interval of a cycle of frequency-shift-keying; the same is true of the other carrier waves $f_2$, $f_3$, and $f_4$. This requires in the receiver, holding of the received signal for four signal periods by the holding and sampling circuits 29A, 29B, 29C, and 29D. As a result the noise characteristics and the sensitivity of reception are improved.

When PSK modulation is carried out for two phases, a reference carrier wave is produced for demodulation, which is not subject to PSK modulation, by performing frequency doubling and then frequency halving.

The modulating signal wave for producing the multi-frequency carrier waves may be any suitable pulse train, such as the clock pulses per se, wave-form transformed clock pulses, or pulses obtained by frequency multiplication or division of the clock pulses. The wave-form transformation may be accomplished by extraction of the fundamental-wave component, transformation into a sinusoidal wave, or other suitable transformation operation. It should be noted, however, that such operation must be performed in both the transmitter and the receiver.

Referring to FIG. 10, a transmitter of a third embodiment of the invention further includes band-pass filters 5E and 5F for producing pilot carrier waves. Their outputs are supplied to the combining circuit 7 so that the transmitter output may contain continuous pilot carrier waves. The level of the pilot carrier waves, however, is maintained relatively low so as not to diminish the power of the other waves transmitted.

Referring to FIG. 11, the receiver of the third embodiment further includes pilot carrier extracting circuits 30A and 30B for extracting the pilot waves from the time-division frequency-shift-keyed wave. An interdetector 31 interdetects the pilot carrier waves and supplies its output to the decoder 18 as bit-synchronizing signals. Additional frequency converters 22E and 22F convert the pilot carrier waves to waves of a single frequency. Additional band-pass filters 21E and 21F provide local-oscillation carrier waves for the pilot carrier waves. The pilot carrier waves are used to produce from either only one such wave or from a combination thereof, a reference carrier wave for synchronization detection. This facilitates synchronization detection, thus providing one of the remarkable features of the invention.

While the invention has been explained in connection with specific embodiments thereof, it should be clearly understood that the invention is not restricted to such embodiments and that various modifications may be made without departing from the spirit or scope of the invention. Furthermore, it will be appreciated that only those parts having direct relationship with the invention have been explained in conjunction with the described embodiments, the various other circuits employed in an operating system being well known to those skilled in the art.

I claim:

1. A time division frequency shift keying transmission system wherein pulse coded information signals are transmitted at separate frequencies on a common line, means responsive to the pulse coded information signals for generating a train of short duration pulses at a repetition rate in synchronization with the pulse repetition rate of the pulses in the information signals, said pulse repetition rate being at a frequency $f_c$, means generating a first oscillating signal at a frequency $f_0$, means responsive to said short duration pulses and said first oscillating signal for amplitude modulating said first oscillating signal with said short pulses and producing first side-band signals spaced from the frequency $f_0$ at whole integer multiples of the repetition frequency $f_0'$, frequency selective means responsive to the modulated first oscillation frequency for selecting several predetermined side-band signals, gate means controlled by the pulse coded information signals for alternatively and sequentially pulse gating said selected side-band signals and providing a plurality of frequency shifted time multiplexed signals representative of the information in said pulse coded information signals, means for generating a second oscillator signal at a transmission frequency $f_t$, means responsive to said second oscillator signal for frequency converting said frequency shifted time multiplexed signals, a receiver of a superheterodyne type and having a third oscillator means for generating a signal at said transmission frequency $f_t$, a frequency converter responsive to said frequency converted transmitted frequency shifted time multiplexed signals and the third oscillator signal for reproducing said plurality of frequency shifted time multiplexed signals, decoding means responsive to said reproduced frequency shifted time multiplexed signals for generating a second train of short duration pulses at substantially the same repetition rate and in synchronization with the pulse repetition rate of the reproduced plurality of frequency shifted time multiplexed signals, means for generating a fourth oscillator signal at a frequency $f_0'$, means responsive to said decoded second train of pulses for amplitude modulating said fourth oscillating signal with said second train of pulses to produce second side-band signals spaced from the frequency $f_0'$ at whole integer multiples of the repetition frequency $f_c$, a second frequency selection means responsive to the modulated fourth oscillator signal for selecting second side-band signals corresponding with the whole integer multiples of side-band signals selected by said first frequency selecting means, third frequency selective means responsive to the reproduced plurality of frequency shifted time multiplexed signals for separating said signals in frequency to produce received side-band signals corresponding with said selected side-band signals generated from said gate means, frequency converter means responsive to said received side-band signals and said second side-band signals for combining corresponding pairs of whole integer multiples of said side-band signals for producing common frequency beat signals indicative of the difference in frequency between corresponding pairs of received and second side-band signals, means combining said common frequency beat signals for producing a reference beat signal having said common beat frequency with a time duration commensurate with the summed total of the pulse durations of said received frequency shifted time multiplexed signals, coherent detector means individually responsive to said whole integer multiples of separated received side-band signals and said reference beat signal for demodulating said received side-band signals.

References Cited

UNITED STATES PATENTS

| | | | |
|---|---|---|---|
| 2,844,650 | 7/1958 | Dutton | 178—51 |
| 2,879,387 | 3/1959 | Kahn | 178—66 X |
| 3,204,035 | 8/1965 | Ballard et al. | 178—66 X |
| 3,205,441 | 9/1965 | Likel | 325—163 |
| 3,214,691 | 10/1965 | Sproul et al. | 178—66 X |

RALPH D. BLAKESLEE, *Primary Examiner.*

W. S. FROMMER, *Assistant Examiner.*

U.S. Cl. X.R.

178—66; 179—15; 325—30; 343—204